US012692360B2

(12) United States Patent
Risku et al.

(10) Patent No.: US 12,692,360 B2
(45) Date of Patent: Jul. 28, 2026

(54) FLAME RETARDANT CHEMICAL COMPOSITIONS

(71) Applicant: Nordtreat Oy, Vantaa (FI)

(72) Inventors: Ari Risku, Porvoo (FI); Carl-Eric Wilen, Esbo (FI)

(73) Assignee: Nordtreat Oy, Vantaa (FI)

( * ) Notice: Subject to any disclaimer, the term of this patent is extended or adjusted under 35 U.S.C. 154(b) by 0 days.

(21) Appl. No.: 17/796,719

(22) PCT Filed: Jan. 30, 2020

(86) PCT No.: PCT/EP2020/052305
§ 371 (c)(1),
(2) Date: Aug. 1, 2022

(87) PCT Pub. No.: WO2021/151493
PCT Pub. Date: Aug. 5, 2021

(65) Prior Publication Data
US 2023/0072612 A1     Mar. 9, 2023

(51) Int. Cl.
| | |
|---|---|
| *C08K 3/016* | (2018.01) |
| *C08F 220/18* | (2006.01) |
| *C08K 3/015* | (2018.01) |
| *C08K 5/00* | (2006.01) |
| *C08K 5/098* | (2006.01) |

(52) U.S. Cl.
CPC ........ *C08K 3/016* (2018.01); *C08F 220/1804* (2020.02); *C08K 3/015* (2018.01); *C08K 5/098* (2013.01); *C08K 5/0058* (2013.01)

(58) Field of Classification Search
CPC ..... C08L 33/00; C09D 33/00; B27K 2240/30; C08K 5/098; D21H 5/0002; C09K 21/02; C09K 21/06
See application file for complete search history.

(56) References Cited

U.S. PATENT DOCUMENTS

| | | | | |
|---|---|---|---|---|
| 3,925,288 | A * | 12/1975 | Ganslaw | D21H 5/0002 |
| | | | | 526/318.4 |
| 5,026,747 | A | 6/1991 | Jolitz et al. | |
| 8,273,813 | B2 * | 9/2012 | Beck | A62D 1/0071 |
| | | | | 252/2 |
| 2006/0086283 | A1 * | 4/2006 | Ray | B27K 3/16 |
| | | | | 427/393 |
| 2006/0241229 | A1 * | 10/2006 | Yoshimura | D06M 15/263 |
| | | | | 524/416 |
| 2007/0187657 | A1 | 8/2007 | Griem | |
| 2007/0262290 | A1 * | 11/2007 | Beck | C08F 220/06 |
| | | | | 525/384 |
| 2007/0289752 | A1 | 12/2007 | Beck et al. | |
| 2010/0062153 | A1 * | 3/2010 | Curzon | C04B 41/65 |
| | | | | 427/180 |

| | | | | |
|---|---|---|---|---|
| 2014/0371125 | A1 | 12/2014 | Wakita | |
| 2015/0147478 | A1 * | 5/2015 | Shutt | D06M 13/184 |
| | | | | 427/427.7 |
| 2016/0331668 | A1 | 11/2016 | Zaidel | |
| 2017/0208815 | A1 | 7/2017 | Sharma et al. | |
| 2019/0171998 | A1 * | 6/2019 | Conboy | G06Q 10/083 |
| 2019/0172071 | A1 * | 6/2019 | Conboy | B27K 3/0278 |

FOREIGN PATENT DOCUMENTS

| | | | | | |
|---|---|---|---|---|---|
| CN | 103170085 | A * | 6/2013 | | A62D 1/06 |
| CN | 103958145 | A | 7/2014 | | |
| CN | 106413812 | A | 2/2017 | | |
| CN | 106572655 | A | 4/2017 | | |
| CN | 110055755 | A | 7/2019 | | |
| DE | 2365789 | A * | 4/1976 | | C08F 18/08 |
| EP | 2813616 | A1 | 12/2014 | | |
| JP | 2005187582 | A | 12/2003 | | |
| JP | 2004238492 | A * | 8/2004 | | |
| JP | 2004339677 | A | 12/2004 | | |
| JP | 2008231363 | A * | 10/2008 | | |
| JP | 2011-105921 | A | 6/2011 | | |
| JP | 2011105931 | A | 6/2011 | | |
| JP | 2012021247 | A | 2/2012 | | |
| JP | 2018058916 | A * | 4/2018 | | |
| JP | 2018150418 | A | 9/2018 | | |
| WO | 0207949 | A1 | 1/2002 | | |

OTHER PUBLICATIONS

Machine translation of JP 2008231363 (2008, 6 pages).*
MCP (An Introduction to Vinyl Acetate-Based Polymers, Mallard Creek Polymers, 2021, 3 pages).*
Machine translation of JP 2004238492 (7 pages, 2004).*
Human assisted machine translation of DE 2365789 (2024, 8 pages).*
Machine translation of JP 2011-105921 (2011, 4 pages).*
Machine translation of JP 2018-058916 (2018, 5 pages).*
Machine translation of CN 103170085 (2013, 7 pages).*
International Search Report for Application No. PCT/EP2020/052305, dated Aug. 9, 2020, 4 pages.
Office Action for Japanese Patent Application No. 2022-546561, dated Sep. 11, 2023, 14 pages.
Office Action for Chinese Application No. 202080095296.3, dated May 27, 2023, 8 pages.

* cited by examiner

*Primary Examiner* — Brieann R Johnston
(74) *Attorney, Agent, or Firm* — Laine IP Oy

(57) ABSTRACT

The present invention relates to the field of chemical compositions and flame retardants. Specifically, the invention relates to a composition for imparting flame retardancy comprising an organic salt as a fire-retardant compound, a binder and a surfactant. Also, the present invention relates to a method for manufacturing said composition and a method of imparting flame retardancy to a substrate comprising applying said composition to the substrate. And still, the invention relates to uses of said composition e.g. for imparting flame retardancy to a substrate. Furthermore, the invention relates to products comprising said composition.

17 Claims, No Drawings

FLAME RETARDANT CHEMICAL COMPOSITIONS

The present invention relates to the field of chemical compositions and flame retardants. Specifically, the invention relates to a composition for imparting flame retardancy comprising an organic salt as a fire-retardant compound, a surfactant, and a binder. Also, the present invention relates to a method for manufacturing said composition and a method of imparting flame retardancy to a substrate comprising applying said composition to the substrate. And still, the invention relates to uses of said composition e.g. for imparting flame retardancy to a substrate.

BACKGROUND

Both fire regulations and safety considerations require the treatment of many materials with a fire retardant in order to reduce the risk of or at least slow down the spread of potentially devastating fires. A treatment may also alter the pyrolysis of the burning material so that the evolution of both flammable and toxic gases is decreased.

Typically, any potentially combustible material used in construction (both internal and external surfaces as well other structures), such as upholstery, isolation etc. may be treated with a fire-retardant composition to improve said properties. Materials that can be treated are any combustible materials including, but not limited to, wood, fabrics, plastics, and others.

Many different types of fire-retardant chemical compositions have been used starting from the suggestion of Gay-Lussac in the early $19^{th}$ century to use a composition comprising borax in combination with ammonium phosphate and ammonium chloride to improve the fire safety of French theaters. Many different fire-retardant compositions have been developed, although most of these suffer from various disadvantages, mainly related to environmental or health issues, or in some instances cost.

Phosphate-based chemical compositions are still used in many instances both to fight fires and as fire-retardants. Examples of these compositions include red phosphorus, inorganic phosphates such as ammonium phosphate, organic phosphates and phosphonates such as guanidine phosphate and resorcinol-bis(diphenylphosphonate), and inorganic phosphonates. Although being efficient as fire-fighting chemicals, the phosphates and phosphonates have to be used in relatively high quantities and some have even been reported to display toxicity, limiting their usefulness. Flame retardants based solely on phosphates or phosphonates also cause degradation of wood treated with these compounds, possibly due lowering the pH of the wood.

Halogenated, mainly brominated, organic compounds have been widely used as fire retardants due to their inhibitory effect on the chemistry of combustion leading to a reduced flammability of products and materials treated with these compounds. Especially brominated compounds such as polybrominated diphenyl ethers have proved to be highly efficient in many applications including electronics, textiles and furniture. The use of halogenated fire-retardants has however been largely discontinued and these compounds widely banned from use after increasing evidence that they are persistent, bioaccumulative and toxic to both humans and animals with symptoms caused including neurobehavioral effects and endocrine disruptions.

Boron compounds have also been widely used in fire-retardant compositions that can be applied to a multitude of materials such as wood and textiles. Compounds that are used include boric acid, borax, various oxides of boron, as well as mixtures of these. However, several boron compounds including boric acid have been reported to be carcinogenic and possibly toxic especially if taken internally or inhaled in large quantities or over long periods of time. The European chemicals agency ECHA has also included e.g. boric acid on its list of substances of very high concern.

In addition to the compounds mentioned above, some fire-retardant compounds and compositions also exist that are less widely used. One example is bridged polymers with intrinsic fire retardant properties. These polymers combine the properties of being both efficient at resisting combustion and, when they burn, not producing any additional toxic gases. The polymers can in some cases also be modified to increase their intrinsic fire-resistance by e.g. increasing their rigidity, varying the monomers used or increasing hydrogen-bonding between polymers. The polymers are, however, both difficult and costly to manufacture, thus limiting their usefulness as industrial scale fire retardants.

Additionally, some iron(III)-salts may also be used to form fire-retardant compounds, one example of these is iron(III)phosphate also known as iron orthophosphate. The main drawbacks of using these iron salts is that they generally require a low pH of around 2 to dissolve completely in water and that they will many times cause a slight red discoloration of the treated material.

As an example of fire-retardant compositions EP1984437 B1 discloses a flame retardant chemical composition comprising a source of citrate ion, a source of benzoate ion and ammonium phosphate that can be used to treat suitable materials to give them flame retardant properties.

SUMMARY OF THE INVENTION

According to the present invention, it was surprisingly found that organic salt-based flame retardants in combination with specialty binders and surfactants gives a composition that can be used to treat porous materials to impart excellent flame retardant properties to them. The present invention provides a fire-retardant chemical composition for treating combustible or flammable materials that is environmentally benign before application to a substrate, does not give off any toxic or noxious fumes after drying, and is efficient in retarding the progression of a fire. Thus, the composition of the present invention overcomes the drawbacks of the prior art. The composition of the present invention is free of carcinogenic materials meaning that in addition to providing the material with excellent fire retardant properties, it is also safe for all types of use including finishing or upholstering in confined spaces. As the treated material does not give off any volatile organic compounds (VOC's) or other harmful chemicals, it is also environmentally superior when compared to more traditional compositions and methods for treating these materials.

Advantages of the present invention include that the flame retardant composition can be manufactured easily and cost-effectively, also in industrial scales. A further advantage of the present invention is that it provides flame retardancy properties with better tolerance towards water and longer fire retardant durability for the treated substrate. Furthermore, an advantage of the present invention is that the composition is better absorbed into the treated substrate and therefore provides an improved flame retardancy of the treated substrate.

The present invention enables finished and cured products comprising flame retardant characteristics, which products are free of traces of (volatile) organic solvents as well as toxic compounds such as formaldehyde.

The present invention relates to a composition for imparting flame retardancy, wherein the composition comprises an organic salt as a fire-retardant compound, a surfactant compound for enhancing the absorption of the composition in a substrate, and a binder. The composition may further contain additives such as a flame retardant based on radical generators, phosphorous-based flame retardants, moisture-binding compound, pigment, a compound with anti-bacterial and/or anti-fungal activity, UV stabilizer, antioxidant, inorganic salt or any combinations thereof.

The present invention also relates to a method for manufacturing a composition of the present disclosure.

Still, the present invention relates to a method of imparting flame retardancy to a material comprising applying a composition of the present invention to the material.

And further, the present invention relates to use of a composition of the present invention for imparting flame retardancy to a material.

Still further, the present invention relates to a product comprising the composition of the present invention.

DETAILED DESCRIPTION

The target of the present invention was to develop a fire-retardant chemical composition that is environmentally benign, does not cause any health concerns and does not give off any harmful vapors after application to a material thus making it safe for use both on the outer surfaces of buildings and on surfaces and objects indoors.

The fire safety of materials, surface linings etc. are classified in accordance with European standard EN13501-1, the test method according to this standard is the single burning item test according to EN13823. Based on the results of the test, materials are then divided into seven classes according to the Euroclass system, materials in class A are non-combustible or have limited combustibility, the combustibility rises successively in classes B through F. Thus, inherently combustible materials such as wood and fabrics can generally not achieve a rating higher than B, i.e. a rating of A. Additional classification of the material includes evaluation of the smoke production and formation of flaming droplets in the same test. Class s-1 denotes the lowest amount of smoke formation, classes s-2 and s-3 denoting successively higher amounts of smoke formed. Similarly, d0 indicates that no flaming droplets are formed, d1 and d2 indicate higher amounts.

Indoor air quality is monitored by several different methods and several standards exist both for indoor air quality and for classifying construction products according to their impact on indoor air quality. Compounds and compound groups analyzed usually include e.g. VOC's, formaldehyde, and ammonia, in addition to carcinogenic and toxic compounds as well as olfactory analyses such as odors. ISO standard 16000 defines various methods for sampling and analyzing indoor air, additional standard tests have also been developed by e.g. the California Department of Public Health (CDPH standard method v 1.1). The Building Information Foundation in Finland (RTS sr) additionally grants building materials emission classifications based on tests of the materials after a period of 28 days. According to this standard, a product with a classification of M1 has the lowest levels of emissions and classifications M2 and M3 have higher levels of emissions than M1.

More information on the requirements of the standards mentioned as well as standardized testing procedures can be found through the respective standardizing agencies.

As used herein, the expressions "material" and "substrate" refer to any material that can be treated with the composition of the present invention, thus improving their resistance to fire and flames. A non-limiting list of such materials includes solid materials such as wood, textiles, insulation, plastics, polymers, paper, cardboard, and any combinations thereof.

As used herein, the expression "fire-retardant" refers to a compound or composition that is used to slow or stop the spread of fire or to reduce its intensity. These compounds can function by reducing the flammability of fuels or delay their combustion. The term "flame-retardant" can be used synonymously.

As used herein, the expression "fuel" refers to any material that can be made to react with other substances so that it releases chemical energy as heat or to be used for work, i.e. any material that burns or will burn in a fire or when exposed to fire.

As used herein, "organic salt" refers to a salt formed from an acid and a base of which at least one is organic. The organic salt may be formed e.g. from an organic acid and an organic base, an organic acid and an inorganic base, or an inorganic acid and an organic base.

As used herein, "organic acid" refers to carboxylic acid or other acidic organic compounds. Examples of organic acids include, but are not limited to, aspartic acid (CAS number 56-84-8), 1,2,3,4-butanetetracarboxylic acid (CAS number: 1703-58-8), citric acid (CAS number 77-92-9) and its hydrates such as citric acid monohydrate (CAS number 5949-29-1), ethylenediaminetetraacetic acid (CAS number: 60-00-4), gluconic acid, poly(acrylic acid) (CAS number: 9003-01-4), poly(methacrylic acid) (CAS number 25087-26-7), poly(aspartic acid) (CAS number 25608-40-6), poly(glutamic acid) (CAS number 25736-27-0), polycarboxylates such as poly(methyl methacrylate-co-butyl acrylate-co-methacrylic acid), poly(butyl acrylate-co-methacrylic acid-co-methyl methacrylate-co-styrene), oxalic acid (CAS number 6153-56-6), tartaric acid (CAS number 133-37-9) and/or any combinations thereof. As used herein, "organic acid" includes the compounds in anhydrous form as well as any hydrates.

An organic salt according to the present invention may be formed by neutralization of the organic acid groups partially or completely by customary neutralization agents such ammonia, amines, preferable alkali metal hydroxides, alkali metal oxides, alkali metal carbonates or alkali metal bicarbonates and any mixtures thereof. Potassium and sodium are particularly preferred among alkali metals very particular preference is given to potassium hydroxide, potassium carbonate or potassium bicarbonate and also to any mixtures thereof. Typically, neutralization is achieved by admixing the neutralization agent as an aqueous solution with the acid to form the organic salt. In some cases, the neutralization agent can be used in excess to acid groups. In many cases, the sodium, ammonium and potassium salts of the organic acids are generally quite soluble in water.

Alternatively, the organic acids can be reacted with reactive metals such as magnesium, zinc, bismuth to produce an organic salt.

As used herein, all percentages refer to mass-percent of the total composition, i.e. the mass fraction ($w_i$) of a compound's mass ($m_i$) of the total mass of the composition ($m_{tot}$), with a denominator of 100 (i.e. ($m_i/m_{tot}$)*100), unless stated otherwise. Similarly, ppm (parts per million) refers to the portion of the total mass of the composition unless stated otherwise.

A composition of the present invention imparts, i.e. results, in flame retardant characteristics in a substrate, wherein the composition comprises an organic salt as a fire-retardant compound, a surfactant, and a binder.

In one embodiment of the invention the organic salt is selected from the group consisting of potassium, zinc, magnesium, or bismuth salts of an organic acid, and any combination thereof. The organic salt may be present in the composition in any amount provided that the composition has flame retardant effects.

Non-limiting examples of other organic salts that can be used in in a fire retardant composition according to the present invention are zinc citrate (CAS number: 546-46-3), magnesium citrate (CAS number: 144-23-0), poly(meth-acrylate sodium salt), aspartic acid potassium salt, tartaric potassium salt, and ethylenediaminetetraacetic acid, tripotassium salt dehydrate (CAS number: 65501-24-8).

In a specific embodiment of the present invention, the organic salt is selected from group consisting of inorganic or organic salts of citric acid. In a specific embodiment, the organic salt, e.g. potassium citrate, is present in the composition in an amount of at least 10% (e.g. 10 to 70%), preferably at least 15%, most preferably 19 to 23%.

The term "surfactant" as used herein and hereafter means any compound that has the ability to reduce surface tension when dissolved or dispersed in water, or in water-based solutions or dispersions, and/or which reduces interfacial tension between two liquids, or between a liquid and a solid, and includes, but is not limited to, detergents, wetting agents and emulsifiers.

In one embodiment the surfactant is selected from the group consisting of an ionic surfactant and a non-ionic surfactant. In general, surfactants are chemical compounds comprising both hydrophilic and hydrophobic groups. The hydrophilic groups can either be ionic (e.g. $-SO_4^-$—, $-SO_3^-$, $-COO^-$, and $-N(CH_3)_3^+$) or nonionic (e.g. $-O-(CH_2-CH_2-O)_n-H$). The surfactants can also be zwitterionic surfactants, i.e. the surfactant comprises both cationic (e.g. $-N(CH_3)_3^+$) and anionic groups (e.g. $-SO_3^-$). The most commonly used hydrophobic groups are linear or branched hydrocarbon chains comprising saturated, unsaturated and/or aromatic moieties. Optionally, the hydrocarbon groups of the surfactants may also comprise one or more heteroatoms. Examples of suitable non-ionic surfactants include, but are not limited to, alpha-olefin sulfonates, polyether-modified polysiloxanes, ethoxylated sorbitan alkanoates, alkyl glucosides, fatty acid ethoxylates, fatty alcohol ethoxylates, fatty amide ethoxylates, octylphenoxy poly(ethyleneoxy)ethanol), octaethylene glycol monodo-decyl ether, commercially available non-ionic surfactants marketed e.g. under brand names Clariant (Emulsogen RAL 100, RAL 109, RAL 208, RAL 307, R100 R 109, R208, R307), Croda (Maxemul 5010, 5011), GEO SC (Bisomer EP100DMA, EP150DMA, PEM63P HP), Ethox (E-Sperse RS-1616, RS-1617, RX-201), Aerosol (Solvay), and BASF (Lutensol AT types), and polymerizable surfactants e.g. Hitenol AR series and Noigen series (Montello), and others, or any mixtures thereof. Examples of ionic surfactants include, but are not limited to, dialkyl sulfosuccinates, sodium lauryl sulfate and sodium stearate. A surfactant may be in the form of a solution. A surfactant may be present in the composition of the present invention in any amount provided that the composition has flame retardant effects. In a specific embodiment, the surfactant e.g. non-ionic surfactant is present in the composition in an amount of less than 10%, preferably less than 5%, most preferably 0.5 to 2%.

In one embodiment of the present invention, the surfactant is a polymeric surfactant. Examples of a polymeric surfactants includes, but is limited to, EO/PO (ethylene oxide/propylene oxide) block copolymers, methacrylic copolymers, polyhydroxystearate derivatives, and alkyd PEG resin derivatives.

In one embodiment of the present invention, the surfactant is selected from the group containing low-foaming surfactants. By lowering the foaming of the surfactant by a ratio of 5:1, the absorption of the fire-retardant composition is improved by 17%. Improving the absorption of the fire-retardant composition enables achieving the same fire-retardant efficiency with fewer treatments of the substrate as well as deeper absorption of the composition into the substrate.

In one embodiment of the invention, a composition comprising an organic salt, a surfactant, and a binder is used for imparting flame-retardant properties to said substrate or material.

The use of the surfactant results in the fire-retardant composition being absorbed in the material to be treated instead of forming a film on the surface of the material. It is to be understood that said fire-retardant composition may be fully absorbed in the material or one part of said fire-retardant composition may be absorbed in the material and one part of the composition may be present on the surface of the material. It is also to be understood that said composition may be only present on the surface of the material. Using the surfactant further improves the fire-retardant properties of the composition. As an additional benefit, the use of a surfactant in a fire-retardant composition comprising an organic salt also aids in the dissolution of the salt in an aqueous solvent as well as preventing flocculation, creaming or sedimentation when the salt is added to said solution.

Therefore, in one embodiment of the invention, a composition comprising an organic salt, a surfactant, and a binder, wherein the organic salt can be admixed with the binder without flocculation, creaming or sedimentation.

In one embodiment of the present invention the flame-retardant composition comprises a binder to improve the adhesion of the composition to the substrate as well as improve the resistance of the finished surface to weathering. The binder may comprise or be e.g. an environmentally advanced aqueous dispersion of a straight acrylic copolymer (e.g. without any additional solvent, formaldehyde, or ammonia). A binder may be included in the composition e.g. in amounts that are 3 to 20%, preferably 5 to 10%.

As used herein and hereafter, "coating" and "coverage" is a covering that is present on the surface of a substrate or material. Even though the covering is usually on the on the surface of a substrate or material, the covering can also be present inside the substrate or material. The function of said coating may be decorative, functional, or both. Examples of decorative coatings include, but are not limited to, paints and lacquers. Examples of functional coatings include, but are not limited to, coatings imparting flame retardancy, and coatings that change the surface properties of the substrate, such as adhesion, wettability, corrosion resistance, or wear resistance. A binder may be comprised in the coating as such and/or with additional components. It is to be understood that said coating may comprise the composition of the invention or, alternatively, said coating may comprise additional or other components than the composition of the invention. Therefore, the composition of the present invention may form a coating of a material and/or may be absorbed in the material.

In one embodiment of the invention, the binder comprises a polymer of one or more acrylate monomer(s). Said polymer can be a homopolymer or a copolymer. Examples of acrylate monomers include, but is not limited to, n-butyl acrylate (BA), ethyl acrylate, methacrylates, lauryl acrylate, phenoxy ethyl acrylate, tripropylene glycol diacrylate, hexanediol di-acrylate and trimethylolpropane triacrylate, or any derivative thereof. Alternatively, or additionally, the binder comprises a polymer of one or more commercially available binders. Examples of commercially available binders include, but are not limited to, Zeffle SE 310 (Daikin Chemical Europe GmbH), Zeffle SE 405 (Daikin Chemical Europe GmbH), Zeffle SE 700 (Daikin Chemical Europe GmbH), Synexil SAB (Synthos S.A.), Synexil DGP (Synthos S.A.), Aquamac® 477 (Polynt Composites), Acronal® 4848 (BASF Dispersions & Resins), Acronal® ECO 6270 (BASF Dispersions & Resins), Acronal® 4111 (BASF Dispersions & Resins), WorléeCryl® 8273 (Worlée-Chemie G.m.b.H), Revacryl AE 3723 (Synthomer), Aquamac® 477 (Polynt Composites), Akuabrid HM 2124 (T&L Co., Ltd. Polymer Technology Centre), CHP 559 (CH-polymers), CHP 550 (CH-Polymers) and CHP 570 (CH-polymers).

In a specific embodiment of the invention, the binder comprises a polymer of one or more acrylate monomer(s) independently selected from the group consisting of n-butyl acrylate, methyl methacrylate (MMA), lauryl acrylate, phenoxy ethyl acrylate, tripropylene glycol diacrylate, hexanediol diacrylate and trimethylolpropane triacrylate.

In one embodiment of the invention, the binder comprises a copolymer of two or more monomers each independently selected from the group consisting of acrylates, styrene, and vinyl acetate.

In a specific embodiment of the invention, the binder comprises a copolymer of two or more monomers each independently selected from the group consisting of n-butyl acrylate, methyl methacrylate, vinyl acetate, and styrene.

In one embodiment of the invention, the binder comprises a copolymer of silylated, phosphorous and/or fluorinated monomers.

In one embodiment of the invention, the binder comprises a copolymer of two or more monomers each independently selected from the group consisting of n-butyl acrylate, methyl methacrylate, vinyl acetate, styrene, and silylated, phosphorous and/or fluorinated monomers.

In one embodiment of the invention, the binder is a waterborne acrylate emulsion, preferably having a minimum film forming temperature below room temperature. In a non-limiting example, the binder can be an acrylic polymer prepared from mixtures of monomers of n-butyl acrylate (BA) and methyl methacrylate (MMA), preferably using sodium dodecyl sulfate and/or polyethylene glycol mono nonyl phenyl ether as surfactants and potassium persulfate as initiator for seeded emulsion polymerization. For weather resistance compositions, preferred binders comprise copolymers formed from monomer mixtures comprising BA and MMA together with functional monomers comprising silicon, phosphorus, fluorine, nitrogen derivatives and/or radical generators, or combinations thereof.

Apart from the single-stage procedure as a classical emulsion process (also referred to as homogeneous dispersion), one can produce the dispersion in a two-way-stage process (also referred to as heterogeneous dispersion or core shell dispersion). In addition, crosslinking reactions can be induced during emulsion polymerization or during drying of coating films. Usually, di-functional or tri-functional monomers are polymerized in order to crosslink polymer particles (intra particular crosslinking) during manufacturing process. Alternatively, functional groups (such as carboxyl groups) of acrylate dispersions may be crosslinked during filming process by adding multivalent metal ions. The crosslinking enhances the non-stickiness (block resistance) of films for wood coatings.

The emulsion polymerization can be conducted in batch, semibatch or continuous reactor system using conventional, mini-, micro- or inverse emulsion polymerization techniques.

As used herein and hereafter, "derivative" is a chemical compound or a radical of a chemical compound. Said radical of a chemical compound can be covalently attached to a monomer forming a polymer. As used herein and hereafter, a "monomer" forms the repeating units of a polymer. Examples of fluorine derivatives include, but is not limited to, fluoride and trifluoromethyl. It is also to be understood that silicon, phosphorus, fluorine, and/or nitrogen derivatives can be chemical compounds comprising silicon, phosphorus, fluorine, and/or nitrogen that is/are comprised in mixtures comprising monomers. Examples of functional monomers comprising silicon, phosphorus, fluorine, nitrogen derivatives and radical generators include, but is not limited to, 3-methacryloxypropyltrimethoxysilane, phosphate esters of polypropylene glycol monomethacrylate, 2,2,6,6-tetramethyl-1-(phenylthio)-4-piperidyl methacrylate, N-(cyclohexylthio)phthalimide, and 2,2,3,3,4,4,5,5,6,6, 7,7-dodecafluoroheptyl methacrylate, N-(cyclohexylthio) phthalimide, fluoride, trifluoromethyl, ammonium sulfate, and disodium hydrogen phosphate.

In one embodiment of the invention, the composition for imparting flame retardancy comprises an organic salt, a surfactant, and a binder, wherein the binder comprises a composition of a polymer formed from one or more acrylate, one or more monomer comprising silicon, phosphorus and/ or fluorine; one or more nitrogen derivative and/or one or more radical generator.

In one specific embodiment of the invention, the composition for imparting flame retardancy comprises an organic salt, a surfactant, and a binder, wherein the binder comprises a composition of a polymer formed from acrylates, styrene, one or more functional monomer comprising one or more silicon, phosphorus, fluorine, and/or nitrogen derivative; and/or one or more radical generator.

In one embodiment of the invention, the composition comprises an organic salt, a surfactant, and a binder, wherein the binder comprises a polymer of BA and MMA together with silylated, phosphorous and/or fluorinated monomers.

In one embodiment of the invention, the composition for imparting flame retardancy comprises an organic salt, a surfactant, and a binder, wherein the binder provides a water contact angle equal to or higher than 51° for a coating.

It was found by the applicant that compositions of the invention for imparting flame retardancy comprising one or more binders comprising polymers of monomers comprising silicon increase water resistance of a wood coating. The amount of silicon monomer is preferably high enough that the water contact angle becomes equal to or higher than 51°, preferably between 70 to 150°. Compositions of the invention comprising polymers comprised of phosphorous monomers improve flame retardancy and adhesion properties as well as distribution of pigments optionally present in the composition. Compositions of the invention comprising polymers comprised of fluorinated monomers also increase the hydrophobicity (i.e. water resistance) of the substrate and especially flame-retardant properties.

In one embodiment of the invention, the composition comprises a salt of an organic acid, a surfactant and a binder, wherein the binder is selected from commercially available binders.

In one specific embodiment of the present disclosure, the composition comprises a salt of an organic acid, preferably potassium citrate, a surfactant, preferably Lutensol AT18, and a binder, preferably a binder comprising a polymer of Acronal ECO 6270, Synexil SAB, Synexil DGP, or CHP-559, Zeffle SE 310, Zeffle SE 405, or Zeffle SE 700.

In one very specific embodiment of the present disclosure, the composition comprises a salt of an organic acid, preferably potassium citrate, a surfactant, preferably Lutensol AT18, and a binder, preferably a polymer of Acronal ECO 6270, and further one or more additives, preferably silver nitrate and/or a sulfenamide additive.

In one embodiment of the present disclosure, the composition comprises a salt of an organic acid, a surfactant, a commercially available binder, and further a sulfenamide, alkoxyamine, calcium carbonate, ammonium sulfate, disodium hydrogen phosphate, Aflammit 978 (Thor) and/or Aflammit 926 (Thor).

In one embodiment of the invention, the composition for imparting flame retardancy comprises an organic salt, a surfactant, and a binder, wherein at least a part of the composition is comprised in a coating of a substrate, wherein the coating is both imparting flame retardancy and improving resistance to weathering of the substrate.

In one specific embodiment of the invention, the composition for imparting flame retardancy comprises an organic salt, a surfactant, and a binder, wherein the binder comprises a polymer of silylated and/or fluorinated monomers, preferably providing a water contact angle equal to or higher than 51°, preferably between 70 to 150°, for a coating.

In yet another specific embodiment of the invention, the composition for imparting flame retardancy comprises an organic salt, a surfactant, and a binder, wherein the binder comprises a copolymer of BA and MMA together with functional monomers comprising silicon, phosphorus, fluorine, and/or nitrogen derivatives, or radical generators, or combinations thereof, preferably providing a water contact angle equal to or higher than 51°, more preferably between 70 to 150°, for a coating.

In yet another specific embodiment of the invention, the composition for imparting flame retardancy comprises an organic salt, a surfactant, and a binder, wherein the binder comprises a polymer of an acrylate monomer, preferably wherein the binder forms a translucent coating with a film formation temperature below 20° C.

In yet another specific embodiment of the invention, the composition for imparting flame retardancy comprises an organic salt, a surfactant, and a binder, wherein the binder comprises a polymer of an acrylate, styrene, vinyl acetate monomers or monomer or water-borne alkyd resins emulsion, preferably forming an opaque or a translucent coating with a film formation temperature below 20° C.

Typically, the composition of binder comprises a polymer of BA and MMA (molar ratio of 1:1) and from 1-10% of functional monomers comprising silicon, phosphorus, fluorine and/or radical generating derivatives, or combinations thereof.

In one embodiment of the invention, the composition for imparting flame retardancy comprises an organic salt, a surfactant, and a binder, wherein the binder additionally comprises a phosphorous compound.

Optionally, in the present invention the compounds comprising silicon, phosphorus, fluorine, and/or nitrogen or radical generating compounds are either polymerizable or non-polymerizable and one or more of the compounds are admixed with the waterborne acrylate-based binder afterwards.

In one embodiment of the invention, a composition comprising an organic salt, a suitable surfactant for enhancing the absorption of said organic salt in a substrate or material, and a binder is used for imparting flame-retardant properties to said substrate or material.

In one specific embodiment of the invention the composition for imparting flame retardancy is free of ammonium phosphate and/or boric acid.

A method for preparing a fire-retardant composition and for treating a suitable material (e.g. porous material) is described herein. One method for preparing the composition comprises adding an organic acid to an aqueous solution of an inorganic or organic base and subsequently adding a binder and a surfactant to the formed mixture to form a fire-retardant composition. The method optionally comprises mixing the organic acid and the aqueous solution of organic or inorganic base to produce the fire-retardant composition. In one embodiment of the present invention the composition is prepared by adding citric acid to an aqueous solution of an inorganic salt comprising magnesium, potassium, zinc, bismuth, or a mixture thereof, and subsequently adding a binder and a surfactant to the formed mixture to form a fire-retardant composition. In a specific embodiment of the present invention the fire-retardant composition is prepared by adding citric acid to an aqueous solution of potassium carbonate and subsequently adding a binder and a surfactant to the formed mixture to form a fire-retardant composition.

In one embodiment a surfactant is added to a mixture comprising an organic salt and a binder to form a fire-retardant composition.

In one embodiment a binder is added to a mixture comprising an organic salt and a surfactant to form a fire-retardant composition.

In one embodiment a mixture of a surfactant and a binder is added to a mixture comprising an organic salt to form a fire-retardant composition.

Alternatively, a method for preparing the composition comprises combining or mixing an organic salt (e.g. potassium citrate), a surfactant, and a binder.

In one embodiment of the present invention, the composition comprising a binder, an organic salt and a surfactant can optionally be further modified by admixing other additives such as flame retardants (such as sulfenamides and phosphorous-based flame retardants), radical generators, UV stabilizers, antioxidants or other inorganic or organic additives. For instance, fluorinated copolymers such as polyvinylidene fluoride (PVDF) and its copolymers or silicon polymers can be admixed with a binder comprising a polymer prepared from acrylates to increase further its water repellence, durability and flame retardant properties. In another embodiment of this invention, various radical generators such as sulfenamides or alkoxyamines or phosphorous-based flame retardants that disrupt the fire reactions of wood are added into either the composition comprising a binder, an organic salt and a surfactant, or combinations of mixtures of one or more of the components of binder, an organic salt and a surfactant to form a first composition and subsequently the rest of one or more of the components are added to the formed first composition to form a second composition.

Optionally, other additives may also be added to the composition comprising an organic salt, a surfactant, and a binder to further improve the properties of the composition and its suitability for the intended use. Said additives include, but are not limited to, a moisture-binding compound, a compound with anti-bacterial and/or anti-fungal activity, a pigment, UV stabilizer, a radical generator, and/or any combination thereof. Further improved properties include but are not limited to e.g. improved weather resistance of the treated surface, improved resistance of the treated surface to mechanical wear, and/or improved fire-retardant properties.

Where needed, other compounds may be added to the compositions to alter one or more of its properties in a direction making it more suitable for a given application. Below follow some examples of additives that can be used.

In one embodiment of this invention, an anti-fungal or anti-bacterial compound may be added to the composition to increase the shelf life of the product and prevent the formation of mold or fungus on a treated surface, this compound may also have some function as a preservative agent. Said compound may be added to the composition by utilizing any conventional methods known to a person skilled in the art. In one embodiment of the invention the composition comprising an organic salt, a surfactant, and a binder further comprises a compound with antibacterial and/or anti-fungal activity. Suitable compounds for this use may be selected from the group consisting of, but not limited to, nitrates (preferably silver nitrate), nitrites (preferably sodium nitrite), benzoates (preferably sodium benzoate), sulfites (preferably sulfur dioxide), $CaCO_3$, triclosan, triclocarban, tetracyclines, beta-lactam antibiotics, fluoroquinolones, propylene glycol, triethylene glycol, ethanol, isopropanol, sodium benzoate, potassium sorbate, and fluconazole, and any combination or mixture thereof. The anti-fungal and/or anti-bacterial compound may be included in the composition e.g. in amounts that are less than 50 ppm, preferably less than 10 ppm, most preferably 0.5 to 2 ppm.

In one embodiment of the invention, the composition comprising an organic salt, a surfactant, and a binder further comprises a moisture-binding compound e.g. a hygroscopic component. Said compound may be added to the composition by utilizing any conventional methods known to a person skilled in the art. The function of this moisture-binding compound is to retain a small amount of moisture in the material that is treated with the composition, further improving the fire-retardant properties of the material after treatment. In one embodiment of the present invention, a moisture-binding compound (e.g. a hygroscopic additive) is selected from the group consisting of any urea-compound e.g. urea, thiourea, guanylurea phosphate, or any mixture thereof. A moisture-binding compound may be included in the composition e.g. in amounts that are less than 10%, preferably less than 5%, most preferably 1 to 3%.

In one embodiment of the invention the composition comprising an organic salt, a surfactant, and a binder further comprises an flame retardant radical generator and/or a phosphorous-based flame retardant that may reduce the amount of free radicals formed in the gas phase and/or may alter the pyrolysis in the condensed phase, or charring. Said flame retardant radical generator and phosphorous-based flame retardant may be added to the composition by utilizing any conventional methods known to a person skilled in the art. The function of the radical generator is to inhibit the formation of the free radicals that are essential for the propagation of the chemical reactions occurring during the combustion of a fuel or act in the condensed phase. In one embodiment of the present invention, the radical generators that further significantly improve flame retardant properties are selected e.g. from the group of radical generators such as 2,3-dimethyl-2,3-diphenylbutane (DMDPA), 3,4-dimethyl-3,4-diphenylhexane, 4,5-dimethyl-4,5-diphenyloctane, peroxides such as dicumyl peroxide and bis(1-methyl-1-phenylethyl) peroxide, 1,4-diisopropylbenzene (polycumyl), alkoxyamines (NOR) such as Flame Stab NOR116, ADK LA-81, sulfenamides, azo alkanes, oxyimides, disulfides, silyl amines, phosphorous-based flame retardants, their derivatives, and mixtures thereof. Examples of phosphorous-based flame retardants include, but is not limited to, phosphine oxides, phosphates, phosphorous functionalized acrylates (such as Sipomer PAM-200, Aflammit 978, Aflammit 926), PCO 900, PCO 960, aluminum diethyl phosphinate (AlPi), bisphenol-A bis(diphenyl phosphate) (BDP), triphenyl phosphate (TPP) and resorcinol bis(diphenyl phosphate) (RDP) and ammonium polyphosphate.

It is to be understood that said radical generator derivative may or may not be covalently attached to a monomer forming a polymer comprised in a binder. Therefore, said radical generator derivative may be a mono- or polyvalent radical or a neutral compound of a radical generator.

In specific embodiments of the present invention, the radical generator is sulfenamide, alkoxyamine, azo-compound, oxyimide, disulfide, silyl amine, or derivatives or mixtures thereof. A radical generator may be included in the composition e.g. in amounts that are less than 10%, preferably less than 5%, most preferably 0.5 to 2%.

In a specific embodiment of the invention, the composition comprises an organic salt, a surfactant, a binder, a moisture-binding compound and a compound with anti-bacterial and/or anti-fungal activity.

In another specific embodiment of the invention, the composition comprises an organic salt, a surfactant, a binder, a moisture-binding compound, a compound with anti-bacterial and/or anti-fungal activity, and a radical generator.

In a very specific embodiment of the invention the composition comprises one or more organic salt, preferably potassium citrate and/or magnesium citrate, as fire-retardant compound(s), urea and/or thiourea as a moisture-binding compound(s), a binder comprising a polymer of one or more acrylate monomer(s), silver nitrate as a compound with anti-bacterial and/or anti-fungal activity, nonionic surfactant, preferably selected from the group consisting of alpha-olefin sulfonates, polyether-modified polysiloxanes, polyether-modified polysiloxanes, ethoxylated sorbitan alkanotes, alkyl glucosides, fatty acid ethoxylates, fatty alcohol ethoxylates, fatty amide ethoxylate or a mixture thereof as a compound for enhancing the absorption of the composition in a substrate. Preferably, said non-ionic surfactant is in the form of a solution.

In another very specific embodiment of the invention the composition comprises potassium citrate as a fire-retardant compound, a binder comprising a polymer of one or more acrylate monomer(s), urea and/or thiourea as a moisture-binding compound(s), silver nitrate as a compound with anti-bacterial and/or antifungal activity, a non-ionic surfactant, preferably selected from the group consisting of alpha-olefin sulfonates, polyether-modified polysiloxanes, polyether-modified polysiloxanes, ethoxylated sorbitan alkanotes, alkyl glucosides, fatty acid ethoxylates, fatty alcohol ethoxylates, fatty amide ethoxylate or a mixture thereof as a compound for enhancing the absorption of the composition in a substrate, and a radical generator for reducing the amount of free radicals formed during the combustion of a flammable substrate. Preferably, said non-ionic surfactant is in the form of a solution.

In one embodiment of the invention, the composition is e.g. an aqueous solution comprising an organic salt, a non-ionic surfactant, and a binder. In a further embodiment the composition is an aqueous solution comprising at least 10% (e.g. 10 to 40%), preferably at least 15%, most preferably 19 to 23% organic salt and less than 10%, preferably less than 5%, most preferably 0.5 to 2% non-ionic surfactant.

In one embodiment of the invention, the composition is e.g. an aqueous solution comprising an organic salt, a non-ionic surfactant, and a binder. In a further embodiment the composition is an aqueous solution comprising at least 10% (e.g. 10 to 40%), preferably at least 15%, most preferably 19 to 23% organic salt, less than 10%, preferably less than 5%, most preferably 0.5 to 2% non-ionic surfactant, and less than 50%, preferably less than 30%, most preferably 2.5% to 10% binder.

In a specific embodiment of the invention, the composition is e.g. an aqueous solution comprising an organic salt, a non-ionic surfactant, a binder, and an anti-bacterial and/or anti-fungal compound. In a further embodiment the composition is an aqueous solution comprising at least 10% (e.g. 10 to 40%), preferably at least 15%, most preferably 19 to 23% citrate salt, less than 10%, preferably less than 5%, most preferably 0.5 to 2% non-ionic surfactant, less than 50%, preferably 2.5% to 10% binder, and less than 50 ppm, preferably less than 10 ppm, most preferably 0.5 to 2 ppm of an anti-bacterial and/or anti-fungal compound.

In a very specific embodiment of the invention, the composition is e.g. an aqueous solution comprising citrate salts, a non-ionic surfactant, a binder, an anti-bacterial and/or anti-fungal compound, and a moisture binding compound. In a further embodiment the composition is an aqueous solution comprising at least 10% (e.g. 10 to 40%), preferably at least 15%, most preferably 19 to 23% citrate salt, less than 10%, preferably less than 5%, most preferably 0.5 to 2% non-ionic surfactant, less than 30%, preferably 2.5% to 10% binder, less than 50 ppm, preferably less than 10 ppm, most preferably 0.5 to 2 ppm of an anti-bacterial and/or anti-fungal compound, and less than 10%, preferably less than 5%, most preferably 1 to 3% of a moisture binding compound.

In one embodiment of the invention, the composition further comprises up to 10%, preferably up to 5%, or most preferably 0.5% to 2% of a sulfenamide derivative as a radical generator. In a specific embodiment, non-limiting examples of the sulfenamide derivatives are 2,2,6,6-tetramethyl-1-(phenylthio)piperidin-4-one, 1-((4-methoxyphenyl)thio)-2,2,6,6-tetramethylpiperidin-4-one, 2,2,6,6-tetramethyl-1-((4-nitrophenyl)thio)piperidin-4-one, 1-(2-nitrophenylthio)-2,2,6,6-tetramethylpiperidin-4-one, 2,2,6,6-tetramethyl-1-(4-methylphenylthio)piperidin-4-one, 1-(2,4,6-trimethylphenylthio)-2,2,6,6-tetramethylpiperidin-4-one, 1-(2-pyridylthio)-2,2,6,6-tetramethylpiperidin-4-one, 1,2-bis(2,2,6,6-tetramethyl-1-(phenylthio)piperidin-4-ylidene)hydrazine, 2,2,6,6-tetramethyl-1-(phenylthio)-4-piperidyl methacrylate, 2,2,6,6-tetramethyl-1-(((thioxo-λ⁴-sulfaneylidene)amino)thio)piperidin-4-one, trans-2,5-dimethyl-1,4-bis(phenylthio)piperazine, 1-butylsulfanyl-2,2,6,6-tetramethylpiperidine, 4'-thiobis-morpholine, 1,1'-thiobis-(2,6-dimethyl)piperidine,1,1'-thiobis-(2,2,6,6-tetramethyl)piperidine, N-1,5,9-((4-methoxyphenyl)thio))-bis-(2,2,6,6-tetramethyl-4-piperid-yl)-amine, 1,1'-thiobis phtalimide, 1,1'-thiobis-carbazole, 2-[(4-methoxyphenyl)thio]-1H-isoindole-1,3(2H)-dione, 9-(phenylthio)-9H-carbazole, 9-[(4-methoxyphenyl)thio]-9H-carbazole, N-(2-naphthalenyl-N-phenyl-4-methylbenzenesulfenamide, N-bis[4-(1-methyl-1-phenylethyl)phenyl]-4-methylbenze-nesulfen-amide, N-cyclohexyl-S-phenyl-N-(phenylthio)thiohydroxylamine, 2,4,6-tris(4-morpholinylthio)-[1,3,5]-triazine, S-(benzo[d]thiazol-2-yl)-N,N-diisopropylthioh-ydroxylamine, S-(benzo[d]thiazol-2-yl)-N,N-dicyclohexyl-thiohydroxylamine, S-(benzo[d]thiazol-2-yl)-N-(benzo[d]thiazol-2-ylthio)-N-(tert-butyl)-thiohydroxylamine, benzo[c][1,2,5]thiadiazole, 3-(piperazin-1-yl)benzo[d]isothiazole, 5-nitrobenzo[c]isothiazol-3-amine, 3-phenyl-1,2,4-thiadi-azol-5-amine, bis(2,2,6,6-tetramethyl-1-(phenylthio)piperi-din-4-yl)decanedioate, bis(2,2,6,6-tetramethyl-1-(phenyl-thio)piperidin-4-yl) carbonate and 1,3-bis(phenylthio)-1H-benzo[d]imidazol-2(3H)-one, or any mixture thereof.

The inclusion of radical generator monomers such as sulfenamides in the binder significantly improves the overall flame-retardant properties.

In one embodiment of the invention, the composition further comprises up to 10%, up to 5%, or 0.5% to 2% of an alkoxyamine as a radical generator. In a specific embodi-ment, non-limiting examples of the alkoxyamine are Adeka LA-81 (CAS number 705257-84-7), 1-cyclohexyloxy-2,2,6,6-tetramethyl-4-octadecylaminopiperidine, bis(1-octy-loxy-2,2,6,6-tetramethylpiperidin-4-yl) sebacate, 2,4-bis[(1-cyclohexyloxy-2,2,6,6-tetramethylpiperidin-4-yl)butylamino]-6-(2-hydroxy-ethylamino-s-triazine, bis(1-cyclohexyloxy-2,2,6,6-tetramethylpiperidin-4-yl)adipate, 2,4-bis[(1-cyclohexyloxy-2,2,6,6-tetramethylpiperidin-4-yl)butylamino]-6-chloro-s-triazine, 1-(2-hydroxy-2-methyl-propoxy)-4-hydroxy-2,2,6,6-tetramethylpiperidine, 1-(2-hy-droxy-2-methylpropoxy)-4-oxo-2,2,6,6-tetrameth-ylpiperidine, 1-(2-hydroxy-2-methyl-propoxy)-4-octade-canoyloxy-2,2,6,6-tetramethylpiperidine, bis(1-(2-hydroxy-2-methylpropoxy)-2,2,6,6-tetramethylpiperidin-4-yl) seba-cate, bis(1-(2-hydroxy-2-methylpropoxy)-2,2,6,6-tetramethylpiperidin-4-yl) adipate, 2,4-bis{N-[1-(2-hydroxy-2-methylpropoxy)-2,2,6,6-tetramethylpiperidin-4-yl]-N-butyl-amino}-6-(2-hydroxyethylamino)-s-triazine, the reaction product of 2,4-bis[(1-cyclohexyloxy-2,2,6,6-tetramethylpiperidin-4-yl)butylamino]-6-chloro-s-triazine with N,N'-bis(3-aminopropyl)ethylenediamine); 2,4-bis[(1-cyclohexyloxy-2,2,6,6-tetramethylpiperidin-4-yl)buty-lamino]-6-(2-hydroxy-ethylamino-s-triazine. Some of the aforementioned alkoxyamine compounds are commercial products that are marketed under the following names: FLAMESTAB ÑOR 116®, TINUVIN ÑOR 371®, IRGATEC CR 76® from BASF SE, Hostavin NOW® from Clariant or ADK Stab LA 81® of Adeka.

In one embodiment of the invention, the composition further comprises up to 10%, up to 5%, or 0.5% to 2% of an organic sulfur compound. As organic sulfur compounds, for example mono sulfides, disulfides, oligomeric disulfides, polymeric disulfides, oligo- or polysulphides are suitable. Disulfides, oligomeric and polymeric disulfides are pre-ferred. Particularly preferred are disulfides and polymeric disulfides.

In one embodiment of the invention, the composition further comprises up to 10%, up to 5%, or 0.5% to 2% of oxyimides. Non-limiting examples of suitable oxyimides can be found in EP2978804B1.

In one embodiment of the invention, the composition further comprises up to 10%, up to 5%, or 0.5% to 2% of azo compounds. Non-limiting examples of suitable azo com-pounds can be found in WO2008101845A1 and EP1668073B1.

In a very specific embodiment of the invention, the composition is e.g. an aqueous solution comprising an salt, a non-ionic surfactant, a binder, an antibacterial and/or anti-fungal compound, a moisture binding compound, and a radical generator. In a further embodiment the composition is an aqueous solution comprising at least 10% (e.g. 10 to 40%), preferably at least 15%, most preferably 19 to 23% organic salt, less than 10%, preferably less than 5%, most preferably 0.5 to 2% non-ionic surfactant, less than 50%, preferably less than 30%, most preferably 2.5% to 10% binder, less than 50 ppm, preferably less than 10 ppm, most preferably 0.5 to 2 ppm of an anti-bacterial and/or anti-fungal compound, less than 10%, preferably less than 5%, most preferably 1 to 3% of a moisture binding compound, and less than 10%, preferably less than 5%, most preferably 0.5 to 2% of a radical generator.

Optionally, the composition of the present invention may comprise an aqueous solvent. Aqueous solvents suitable for the present invention include, but are not limited to, water. In one embodiment of the invention the composition is in the form of an aqueous solution. Alternatively, the composition of the present invention may be in a granulate or powder form. Any known methods for preparing granulates or powder can optionally be utilized in the method for preparing the composition of the present invention and such methods include but are not limited to evaporating the aqueous solvent system.

The fire-retardant composition may also be prepared in a concentrated form wherein the amounts of the individual components are higher, but their relative amounts are the same as listed above. This concentrate may be diluted to the concentrations specified at the site of use to form the fire-retardant composition of the present invention.

Optionally, once all components have been added and thoroughly mixed, the resultant composition is heated and/or degassed, optionally with air, to remove excess $CO_2$ formed in the process. Said heating or degassing is performed to e.g. prevent foaming of the composition.

An additional objective of the present invention was to develop a method for adding a pigment to the fire-retardant chemical composition comprising a salt of an organic acid, a surfactant, and a binder to enable the use of the composition directly for staining materials such as wood, thus negating the need for adding a separate layer of color or topcoat to the material in addition to the fire-retardant treatment and consequently improving the fire resistance of the finished product. Indeed, in one embodiment of this invention, a pigment or a binder or a combination thereof can be further added to the fire-retardant composition of the present disclosure. A combination of pigment and binder may be used to produce a colored composition for tinting the material to be treated. The pigment can be any suitable inorganic or organic pigment that may be added e.g. as a paste, powder, liquid, or solution to the composition. Example of a pigment includes, but is not limited to, $TiO_2$, iron oxide, carbon black and bismuth vanidate. Depending on the specific requirements on the finished product, any pigment known to a skilled person in the art may be chosen. A binder may be included in the composition e.g. in amounts that are less than 50%, preferable less than 30%, most preferably 2.5 to 12%. The amount and type of pigment can be selected among those commonly known by a person skilled in the art depending on the desired color. Optionally, the binder added to the composition may further comprise less than 20%, less than 15%, or about 10% of an ammoniumpolyphosphate mixture to further improve the flame-retardant efficiency. The binder can also further comprise up to 10% $CaCO_3$.

In one embodiment of the present invention, the binder added to the fire-retardant composition comprises 10% ammonium polyphosphate and 10% $CaCO_3$.

In one embodiment of the invention, the flame retardant composition comprises an organic salt, a surfactant, and a binder, wherein said composition additionally comprises a pigment.

In a very specific embodiment of the invention, the composition is e.g. an aqueous solution comprising organic salts, a non-ionic surfactant, a binder comprising a polymer of one or more acrylate monomer(s), an anti-bacterial and/or anti-fungal compound, a moisture binding compound, an additive for reducing the amount of free radicals formed during the combustion of a flammable substrate, and a pigment.

In a very specific embodiment of the invention, the composition is e.g. an aqueous solution comprising organic salts, a non-ionic surfactant, an anti-bacterial and/or anti-fungal compound, a moisture binding compound, a binder, an additive for reducing the amount of free radicals formed during the combustion of a flammable substrate, and a pigment. In a further embodiment the composition is an aqueous solution comprising at least 10% (e.g. 10 to 40%), preferably at least 15%, most preferably 19 to 23% organic salt, less than 10%, preferably less than 5%, most preferably 0.5 to 2% non-ionic surfactant, less than 50 ppm, preferably less than 10 ppm, most preferably 0.5 to 2 ppm of an anti-bacterial and/or antifungal compound, less than 10%, preferably less than 5%, most preferably 1 to 3% of a moisture binding compound, less than 10%, preferably less than 5%, most preferably 0.5 to 2% of an additive for reducing the amount of free radicals formed in the combustion of a flammable substrate, 3 to 20%, preferably 5 to 10% binder, and pigment (in an amount suitable to achieve the desired color or hue).

In one embodiment of the invention a method of imparting flame retardancy to a material or substrate comprises applying a composition of the invention to the material or substrate.

As used herein and hereafter, "applying a composition" refers to methods that comprise applying the composition of the invention to a material in one step, in addition, or alternatively, the different components comprised in the composition of the present disclosure (comprising salt of an organic acid, a binder, and a surfactant) may be applied in any order and in two or more steps to a material. Therefore, it is to be understood that subsequently to applying a composition to the material to form a treated material, the formed treated material comprises the composition of the present disclosure. It is to be understood that said applying of the composition of the present disclosure to a material may be repeated one or more times, preferably to give a coverage of the material with at least 150 g/m2, at least 200 g/m2, or at least 300 g/m2 of fire-retardant composition of the present disclosure. In addition, or alternatively, it is to be understood that the different components comprised in the composition of the present disclosure (i.e at least a salt of an organic acid, a binder, and a surfactant) may be applied in any order and in two or more steps to a material and said applying of the said different components comprised in the composition to the material may be repeated one or more times, preferably to give a coverage of the material with at least 150 g/m2, at least 200 g/m2, or at least 300 g/m2 of fire-retardant composition of the present disclosure.

In one embodiment of the invention a method of imparting flame retardancy to a material or substrate comprises applying a composition of the present disclosure in two steps: i) applying a salt of an organic acid and a surfactant to the material to form a first treated material, and ii) further applying a binder to the formed first treated material to form a second treated material.

In one embodiment of the invention a method of imparting flame retardancy to a material or substrate comprises applying a composition of the present disclosure in two steps: i) applying a salt of an organic acid to the material to form a first treated material, and ii) further applying a surfactant and a binder to the formed first treated material to form a second treated material.

In one embodiment of the invention, a method of imparting flame retardancy to a material comprises applying a composition of the invention to a material or substrate, wherein the material or substrate is selected from the group consisting of wood, textiles, insulation, plastics, polymers, paper, cardboard, and any combinations thereof.

In one embodiment of the present invention, the fire-retardant composition is applied to a suitable substrate or material in order to improve the fire and flame resistance of said material. In yet another embodiment of the present invention, the fire-retardant composition may be applied to a material on-site (e.g. a construction site) or during the manufacturing process of the material. The material treated can be any suitable porous, flammable material used in e.g. construction, furniture, upholstery, clothing, or other similar uses. The material or substrate can be wood, cotton, insulation, isolation, plastics, polymers, textile, paper, cardboard, similar materials, or any combination or mixture thereof. The method for treating the material can be selected from any suitable method used to treat the same or similar material with paints, coats, varnishes, etc.

In one embodiment of the invention the composition is in a form that can be easily applied to a material or surface using methods well known to a skilled person. In a specific embodiment the composition of the present invention is applied e.g. by spray treatment, pressure treatment, vacuum treatment, immersion treatment, brush treatment, impregnation, or rolling, or any combination thereof.

In one embodiment of the invention the amount of composition of the present disclosure applied to the material to be treated is at least 150 g/m$^2$, preferably at least 250 g/m$^2$, and most preferably at least 350 g/m$^2$. This corresponds to an amount of organic salt that is at least 15 g/m$^2$, preferably at least 25 g/m$^2$, and most preferably at least 35 g/m$^2$.

In another embodiment of the invention, the application of fire-retardant composition to a material or substrate is performed in two steps. The first treatment step comprises treating the material or substrate with a fire-retardant composition of the present disclosure not containing binder or pigment. The treatment is repeated a sufficient number of times to give a coverage of the substrate with at least 150 g/m$^2$, at least 200 g/m$^2$, or at least 300 g/m$^2$ of fire-retardant composition corresponding to an amount of organic salt that is at least 15 g/m$^2$, at least 20 g/m$^2$, or at least 30 g/m$^2$. The second step of the treatment comprises treating the material or substrate with a fire-retardant composition comprising a binder in an amount that brings the total amount of composition used to at least 150 g/m$^2$, at least 250 g/m$^2$, or at least 350 g/m$^2$ of fire-retardant composition corresponding to an amount of organic salt that is at least 15 g/m$^2$, at least 25 g/m$^2$, or at least 35 g/m$^2$. Therefore, after the second step, the treated material or substrate comprises a composition of the invention for imparting flame retardancy, wherein the composition comprises an organic salt, a surfactant, and a binder.

In yet another embodiment of the present invention, the application of fire-retardant composition to a substrate or material is performed in two treatment steps. The first treatment step comprises treating the substrate with a fire-retardant composition of the present disclosure. The first treatment step is repeated a sufficient number of times to give a coverage of the substrate with at least 150 g/m$^2$, at least 200 g/m$^2$, or at least 300 g/m$^2$ of fire-retardant composition corresponding to an amount of organic salt that is at least 15 g/m$^2$, at least 20 g/m$^2$, or at least 30 g/m$^2$. The second treatment step comprises treating the substrate with a fire-retardant composition comprising a binder and/or pigment, preferably in an amount that brings the total amount of composition used to at least 150 g/m$^2$, at least 250 g/m$^2$, or at least 350 g/m$^2$ of fire-retardant composition corresponding to an amount of organic salt that is at least 15 g/m$^2$, at least 25 g/m$^2$, or at least 35 g/m$^2$.

In yet another embodiment of the present invention, the application of fire-retardant composition to a substrate or material is performed in two steps. The first treatment step comprises treating the substrate with a fire-retardant composition of the present disclosure further comprising a pigment. The treatment is repeated a sufficient number of times to give a coverage of the substrate with at least 150 g/m$^2$, at least 200 g/m$^2$, or at least 300 g/m$^2$ of fire-retardant composition corresponding to an amount of organic salt that is at least 15 g/m$^2$, at least 20 g/m$^2$, or at least 30 g/m$^2$. The second step of the treatment comprises treating the substrate with a fire-retardant composition of the invention comprising further a pigment, preferably in an amount that brings the total amount of composition used to at least 150 g/m$^2$, at least 250 g/m$^2$, or at least 350 g/m$^2$ of fire-retardant composition corresponding to an amount of organic salt that is at least 15 g/m$^2$, at least 25 g/m$^2$, or at least 35 g/m$^2$.

In yet another embodiment of the present invention, the application of fire-retardant composition to a substrate or material is performed in two steps. The first treatment step comprises treating the substrate with a fire-retardant composition of the present disclosure further containing a pigment. The treatment is repeated a sufficient number of times to give a coverage of the substrate with at least 150 g/m$^2$, at least 200 g/m$^2$, or at least 300 g/m$^2$ of fire-retardant composition corresponding to an amount of organic salt that is at least 15 g/m$^2$, at least 20 g/m$^2$, or at least 30 g/m$^2$. The second step of the treatment comprises treating the substrate with a fire-retardant composition comprising a pigment and a second binder, preferably in an amount that brings the total amount of composition used to at least 150 g/m$^2$, at least 250 g/m$^2$, or at least 350 g/m$^2$ of fire-retardant composition corresponding to an amount of organic salt that is at least 15 g/m$^2$, at least 25 g/m$^2$, or at least 35 g/m$^2$.

In a specific embodiment of the present invention, the application of a fire-retardant composition comprising a salt of an organic acid, a binder, a surfactant, and a radical generator to a substrate or material is repeated one or more times, preferably to give a coverage of the material with at least 150 g/m2, at least 200 g/m2, or at least 350 g/m2 of fire-retardant composition of the present disclosure. Preferably the radical generator is selected from the group consisting of sulfenamides, alkoxyamines, phosphorous-based flame retardants, their derivatives, and mixtures thereof.

In another specific embodiment of the present invention, the application of a fire-retardant composition to a substrate or material is performed in two steps. The first treatment step comprises applying one or more times a fire-retardant composition comprising a salt of an organic acid, a surfactant, and a radical generator by spray treatment and/or vacuum treatment to the substrate or the material, preferably to give a coverage of the material with at least 150 g/m2, at least 200 g/m2, or at least 300 g/m2 of fire-retardant composition of the present disclosure. The second step of the treatment comprises applying one or more times a fire-retardant composition comprising a salt of an organic acid, a binder, a radical generator and a pigment to the substrate or the material, preferably to give a coverage of the material with at least 150 g/m2, at least 250 g/m2, or at least 350 g/m2 of fire-retardant composition of the present disclosure.

In yet another specific embodiment of the present invention, the application of a fire-retardant composition to a substrate or material is performed in two steps. The first treatment step comprises applying one or more times a fire-retardant composition comprising a salt of an organic acid, a surfactant, and a radical generator by spray treatment and/or vacuum treatment to the substrate or the material, preferably to give a coverage of the material with at least 150 g/m2, at least 200 g/m2, or at least 300 g/m2 of fire-retardant composition of the present disclosure. The second step of the treatment comprises applying one or more times a fire-retardant composition comprising a binder, a radical generator and a pigment to the substrate or the material, preferably to give a coverage of the material with at least 150 g/m2, at least 250 g/m2, or at least 350 g/m2 of fire-retardant composition of the present disclosure.

In one embodiment of the invention a method of imparting flame retardancy to a material or substrate comprises applying a composition of the present disclosure to one part of the substrate or material and applying a composition of the present disclosure to another part of the substrate or material.

In a specific embodiment of the present invention a method of imparting flame retardancy to a material or substrate, the method comprises 1) applying a fire-retardant composition comprising a salt of an organic acid, a surfactant, and a radical generator to one part of the material, preferably to give a coverage of one part of the material with at least 150 g/m2, at least 250 g/m2, or at least 350 g/m2 of fire-retardant composition, and 2) applying a fire-retardant composition of the present disclosure to another part of the material, preferably to give a coverage of the another part of the material with at least 150 g/m2, at least 250 g/m2, or at least 350 g/m2 of fire-retardant composition.

A composition of the present invention for imparting flame retardancy may be added to or included in any pre-existing product, which as an example, may be used for flame retardancy or firefighting applications. Such products include but are not limited to liquids, foams, powders, fats, oils, paints, impregnation liquids, and coating and lacquer products.

In one embodiment of the invention a use of a composition of the disclosure is for imparting flame retardancy to a material.

EXAMPLES

The invention is described below with the help of examples. The examples are given only for illustrative purpose and they do not limit the scope of the invention.

Example 1a: Preparation of Compositions Comprising Binder and Surfactant with or without Additive Binder Composition 1: The seeded emulsion polymerization was carried out in a 250 ml double walled glass reactor with temperature control, mechanical stirring and reflux condenser. First, a monomer mixture of 40 g of butyl acrylate (BA) (CAS number: 141-32-2) and 30 g of methyl methacrylate (MMA) (CAS number: 80-62-6) was prepared. Second, an aqueous surfactant solution was prepared by mixing together water (80 g), a mixture of 2.5 g of sodium dodecyl sulfate and 1 g of octylphenoxy poly(ethyleneoxy) ethanol) as well as 0.6 g of sodium bicarbonate. The third mixture consisted of 60 g water and 1.4 g of potassium persulfate (KPS) as an initiator solution.

The reactor was first charged with the surfactant solution and heated up to 80° C. under vigorous stirring. Then 14 g of the monomer mixture together with 12 g of initiator solution was fed into the reactor dropwise over a time of a few minutes. After an additional 15 minutes of polymerization seed nuclei particles had been formed that were used to grow the final emulsion particles. After this, the rest of the monomer mixture together with the rest of the initiator were fed into the reactor over a time of 5 hours. After this, the temperature was raised to 90° C. and maintained for 45 minutes with subsequent cooling and neutralization with ammonia to pH=ca. 8. The water contact angle was 40° for the produced coating.

Binder Composition 2: Prepared in the same manner as Binder Composition 1 with the difference that 3, 6 or 12 g of a silicon functionalized acrylate (3-methacryloxypropyltrimethoxysilane, CAS number 2530-85-0) was additionally fed into the reactor after all of the BA and MMA had been added and prior to heating to 90° C. The water contact angle for the produced coating increased from 510 (using 3 g of silicon functionalized acrylate) to 70° (using 6 g of silicon functionalized acrylate), therefore indicating that the water contact angle is increased as a function of silicon functionalized acrylate concentration. Comparing to the water contact angle of 70° for the produced coating (when using 6 g of silicon functionalized acrylate), using 12 g of silicon functionalized acrylate did only little increase the water contact angle for the produced coating.

Binder Composition 3: Prepared in the same manner as Binder Composition 1 with the difference that 6 g of a silicon functionalized acrylate (3-methacryloxypropyltrimethoxysilane, CAS number 2530-85-0) and 4 g of a phosphorous functionalized acrylate (phosphate esters of polypropylene glycol monomethacrylate, trade name Sipomer PAM-200) were additionally fed into the reactor after all of the BA and MMA had been added.

Binder Composition 4: Prepared in the same manner as Binder Composition 1 with the difference that 6 g of a silicon functionalized acrylate (3-methacryloxypropyltrimethoxysilane), 4 g of a phosphorous functionalized acrylate (phosphate esters of polypropylene glycol monomethacrylate, trade name Sipomer PAM-200) and 2.25 g of a sulfenamide functionalized acrylate (2,2,6,6-tetramethyl-1-(phenylthio)-4-piperidyl methacrylate) were additionally fed into the reactor after all of the BA and MMA had been added.

Binder Composition 5: Prepared in the same manner as Binder Composition 1 with the difference that 6 g of silicon functionalized acrylate (3-methacryloxypropyltrimethoxysilane), 4 g of a phosphorous functionalized acrylate (phosphate esters of polypropylene glycol monomethacrylate), 2.15 g of a sulfenamide functionalized acrylate (2,2,6,6-tetramethyl-1-(phenylthio)-4-piperidyl methacrylate) and 5 g of a perfluorinated acrylate (2,2,3,3,4,4,5,5,6,6,7,7-dodecafluoroheptyl methacrylate) were additionally fed into the reactor after all of the BA and MMA had been added.

Binder Composition 6: Prepared in the same manner as Binder Composition 1 with the difference that 2.15 g of a hindered amine light stabilizer (HALS) functionalized acrylate (CAS number: 68548-08-3, Trade name: ADK STAB LA-82) was additionally fed into the reactor after all of the BA and MMA had been added and prior to heating up the emulsion to 90° C.

Example 1b: Preparation of Compositions Comprising Binder and Additive

Binder Composition 7: Into a dispersion of BA and MMA (Acronal Eco 6270) was added 1 wt % of non-ionic surfactant Lutensol and 1 wt % of sulfenamide additive N-(cyclohexylthio)phthalimide (CAS number: 17796-82-6).

Binder Composition 8: Into a dispersion of BA and MMA (Acronal Eco 6270) was added 1 wt % of non-ionic surfactant Lutensol and 1 wt % of sulfenamide (2-benzothiazolesulfenamide, N-(2-benzothiazolylthio)-N-(1,1-dimethylethyl), CAS number: 3741-80-8).

Binder Composition 9: Into a BA and MMA dispersion (Acronal Eco 6270) was added 1 wt % of non-ionic surfactant Lutensol and 1 wt % alkoxyamine (ADK LA-81, CAS number: 705257-84-7).

Binder Composition 10: Into a dispersion of BA and MMA (Acronal Eco 6270) was added 1 wt % of non-ionic surfactant Lutensol and 10 wt % of calcium carbonate fine particles.

Binder Composition 11: Into a dispersion of BA and MMA (Acronal Eco 6270) was added 20 wt % of a mixture of ammonium sulfate and disodium hydrogen phosphate (1:1 molar ratio).

Binder Composition 12: Into a dispersion of BA and MMA (Acronal Eco 6270) was added 10 wt % of a phosphorous-based flame retardant produced by Thor and sold under the trade name of Aflammit 978.

Binder Composition 13: Into a dispersion of BA and MMA (Acronal Eco 6270) was added 10 wt % of a phosphorous-based flame retardant produced by Thor and sold under the trade name of Aflammit 926.

To examine the water repellency of the coatings prepared from different binders, the water contact angles were measured; a higher water contact angle means better tolerance towards water and longer fire retardant durability for the treated wood. The results are shown in Table 1.

TABLE 1

| Water contact angles for prepared binders | | |
|---|---|---|
| Entry | Binder | Water contact angle |
| 1 | Binder Composition 1 | 40° |
| 2 | Binder Composition 2 | from 51 to 70° * |
| 3 | Binder Composition 3 | 51° |
| 4 | Binder Composition 5 | 70° |

* Depending on the amount of added silicon functionalized acrylate.

The increased water contact angles (from 51° to 70°) of Binder Compositions 2, 3 and 5 in comparison to the water contact angle of Binder Composition 1 (40°) clearly demonstrates that dispersions containing silicon functionalized acrylates and/or fluorinated acrylates repel water better than dispersions lacking silicon functionalized acrylates and/or fluorinated acrylates; therefore, higher tolerance towards water is achieved and thereby increased durability against the effects of weathering of the coated flame retarded wood products.

Example 2: Preparation of a Flame Retardant Chemical Composition Comprising Organic Salt 100 kg $K_2CO_3$ (724 mol) was dissolved in 530 L water and stirred thoroughly. 100 kg citric acid monohydrate (476 mol) was slowly added and the resulting mixture stirred until the evolution of gas ended to form a solution comprising potassium citrate and potassium carbonate. The mixture was further aerated by introduction of pressurized air in the bottom of the container to remove excess $CO_2$ dissolved in the solution.

Silver nitrate 0.5 g and non-ionic surfactant 1 wt % (Lutensol AT18, 20% from BASF) were added and the mixture was thoroughly stirred.

Once all components have been added and thoroughly mixed, the resultant composition is heated and degassed with air to remove excess $CO_2$ formed in the process to prevent foaming.

Example 3: Preparation of a Flame Retardant Chemical Composition Comprising Organic Salt and Radical Generator A flame retardant chemical composition was prepared as in Example 2.

Once all components have been added and thoroughly mixed, the resultant composition is heated and degassed with air to remove excess $CO_2$ formed in the process to prevent foaming.

Additionally, 0.5% w/w of sulfenamide additive N-(cyclohexylthio)phthalimide (CAS number: 17796-82-6) was added to the composition.

Example 4a: Preparation of a Flame Retardant Chemical Composition Comprising Organic Salt, Binder, Surfactant and Pigment To the flame retardant chemical composition of Example 2 was added 10% pigment $TiO_2$ and 10% Acronal Eco 6270 Binder to produce a transparent white composition. The mixture was stirred vigorously until an even solution was achieved. Using pigment $TiO_2$ yields a fire-retardant composition white in color.

Example 4b: Preparation of a Flame Retardant Chemical Composition Comprising Organic Salt, Binder, Surfactant, Pigment and Radical Initiator To the flame retardant chemical composition of Example 3 was added 10% pigment $TiO_2$ and 10% Acronal Eco 6270 Binder to produce a transparent white composition. The mixture was stirred vigorously until an even solution was achieved. Using pigment $TiO_2$ yields a fire-retardant composition white in color.

Example 5a: Absorption of Fire Retardant Composition not Comprising Surfactant into Wood The effect on the absorption of fire retardant composition not comprising surfactant into wood was evaluated by dipping a piece of untreated spruce into solutions of a commercially available fire retardant composition (Phos-Chek FireTrol® by Perimeter Solutions). The piece of wood was submerged into the fire retardant solution for 1 min followed by drying for 1 min in ambient conditions. The piece of wood was weighed before and after the treatment to determine the improvement in absorption of fire retardant composition into the wood. Two parallel experiments were performed on two samples.

On weighing, the average difference in weight for the treatment with the composition not containing surfactant was 3.19 g.

Example 5b: Effect of Surfactant on Absorption of Fire Retardant Composition Comprising Surfactant into Wood The effect of the addition of surfactant on the absorption of fire retardant composition into wood was evaluated by dipping a piece of untreated spruce into solutions of a commercially available fire retardant composition (Phos-Chek Fire-Trol® by Perimeter Solutions) containing 1% Lutensol AT 18 (20%, nonionic surfactant). The piece of wood was submerged into the fire retardant solution for 1 min followed by drying for 1 min in ambient conditions. The piece of wood was weighed before and after the treatment to Table 2 shows the effectiveness of selected citrates as flame retardants for wood as determined using a cone calorimeter according to standard ISO 5560.

When testing a product according to ISO 5660, a sample with the dimension 100 mm×100 mm is subjected to a specific irradiance level. The surface of the sample is heated and starts to emit pyrolysis gases that ignite by a spark igniter. The emitted gases are collected in a hood and transported away through a ventilation system. The heat release is measured using the data on measured oxygen concentration in the emitted smoke. The smoke production is measured continually throughout the test with a laser system.

The parameters measured when testing according to ISO 5660 are heat release rate (kW/m$^2$), total heat release (MJ/m$^2$), mass loss (g/s), effective net heat of combustion (MJ/kg) and smoke production rate (m$^2$/s). Levels of toxic gases can also be measured with FTIR analysis.

TABLE 2

| Entry | Organic salt [a] | Binder | Peak heat release rate (PHRR) |
|---|---|---|---|
| 1 | — | — | 179 |
| 2 | Potassium citrate | — | 165 |
| 3 | Magnesium citrate | — | 170 |
| 4 | Zinc Citrate | — | 162 |

[a] The wood of spruce samples were dipped into the corresponding aqueous citrate salt solution 3 times for 30 seconds. After each dipping round the samples were dried for 30 min in ambient conditions.

Evaluation of the effectiveness of fire retardant compositions comprising binder, surfactant and potassium citrate was investigated using a cone calorimeter. The results are shown in Table 3.

TABLE 3

A comparison of the effectiveness of various fire retardant compositions comprising binder, surfactant and potassium citrate to suppress fire of wood (spruce) by cone calorimeter.

| Entry | Organic salt [a] | Binder and surfactant [b] | Peak heat release rate (PHRR) |
|---|---|---|---|
| 1 | Potassium citrate | 7.5% Binder Composition 1 | 171 |
| 2 | Potassium citrate | 7.5% Binder Composition 2 [c] | 175 |
| 3 | Potassium citrate | 7.5% Binder Composition 3 | 163 |
| 4 | Potassium citrate | 7.5% Binder Composition 4 | 80 |

[a] The wood samples of spruce were dipped into 23% potassium citrate solution three times for 30 seconds. After each dipping the wood samples were dried using IR irradiation.
[b] After the wood samples had been treated with potassium citrate solution, the respective binder composition (concentration based on the potassium citrate solution) was applied on the wood samples comprising potassium citrate. Each binder composition contained 1 wt % of non-ionic surfactant Lutensol.
[c] Binder Composition 2 was prepared as described above using 6 g of silicon functionalized acrylate and providing a water contact angle 70°.

determine the improvement in absorption of fire retardant composition into the wood. Two parallel experiments were performed on two samples.

On weighing, the average difference in weight for the treatment with the composition not containing surfactant was 3.19 g (see Example 5a) and for the composition comprising surfactant was 3.88 g. Thereby, the improvement in absorption caused by the addition of surfactant is approximately 18%.

Example 6: Evaluation of Effectiveness of Fire Retardant Compositions

Flame-retardant compositions comprising potassium citrate (prepared as described in Example 2, without addition of silver nitrate and surfactant), magnesium citrate (CAS number: 144-23-0, 20 wt %) or zinc citrate (CAS number: 5990-32-9, 4 wt %) were tested.

The results in Table 3 demonstrates that phosphorous acrylate (binder composition 3) and sulfenamide acrylate (binder composition 4) both improve flame retardant properties compared to binder compositions 1 and 2 without the phosphorous and sulfonamide functional monomers.

The evaluation of the effectiveness of the fire retardant compositions comprising salts of organic acids, binder, surfactant, and/or additives for coated wood (spruce) was conducted with cone calorimeter. The evaluations were performed as described for the results presented in Table 3 with the difference that the binder compositions (concentration based on the organic salt solution) further comprised or did not comprise an additive (concentration based on the organic salt solution). The results are shown in Table 4.

TABLE 4

Peak heat release rates (PHRR) determined for different fire retardant compositions comprising salts of organic acids, binder compositions comprising binder and surfactant, and/or additives.

| Entry | Organic salt | Binder wt % a) | Additive wt % | Peak heat release rate (PHRR) |
|---|---|---|---|---|
| 1 | — | 7.5% Binder Acronal ECO 6270 | — | 221 |
| 2 | Potassium citrate | 7.5% Binder Acronal Eco 6270 | — | 202 |
| 3 | Potassium citrate | 7.5% Binder Acronal Eco 6270 | 1% of N-(cyclohexylthio)-phthalimide | 120 |
| 4 | Potassium citrate | 7.5% Binder Acronal Eco 6270 | 1% of 2-benzothiazolesulfenamide, N-(2-benzothiazolylthio)-N-(1,1-dimethyl-ethyl) | 116 |
| 5 | Potassium citrate | 7.5% Binder Acronal ECO 6270 | 1% of alkoxyamine (ADK LA-81) | 174 |
| 6 | Potassium citrate | 7.5% Binder Acronal ECO 6270 | 10 wt % Aflammit 978 | 183 |
| 7 | Potassium citrate | 7.5% Binder Acronal Eco 6270 | 10 wt % Aflammit 926 | 183 |
| 8 | Potassium citrate | 3.75% Binder Acronal Eco 6270 | 10 wt % of mixture of ammonium sulfate and di-sodium hydrogen phosphate (1:1 weight ratio). | 161 |
| 9 | Potassium citrate | 7.5% Binder Composition 3 | — | 163 |
| 10 | Potassium citrate | 7.5% Binder Composition 4 | — | 80 |
| 11 | Potassium citrate | 12% Poly(styrene-co-acrylate) binder (Synexil DGB) | — | 141 |
| 12 | Potassium citrate | 7.5% Poly(styrene-co-acrylate) binder (Synexil SAB) | — | 145 |
| 13 b) | Poly(methacrylate sodium salt) | 7.5% Binder Acronal ECO 6270 | — | Prolonged time to ignition from 24 s to 45 s |
| 14 c) | Ethylenediaminetetraacetic acid, tripotassium salt dehydrate | 7.5% Binder Acronal ECO 6270 | — | 98 | a) After the wood samples had been treated with organic salt solution, the respective binder composition (concentration based on the organic salt solution) comprising the respective additive (concentration based on the organic salt solution) were applied on the wood samples comprising organic salt. The binders of entries 1 to 14 further comprises 1 wt % of non-ionic surfactant Lutensol.
b) A 30% solution of poly(methacrylate sodium salt) in water was mixed with binder Acronal Eco 6270.
c) Ethylenediaminetetraacetic acid, tripotassium salt dehydrate was mixed with binder Acronal Eco 6270.

The results in Table 4 clearly show that binder compositions 3 and 4 (entries 9 and 10, respectively) enhance flame retardant efficacy compared to binder Acronal ECO 6270 (entry 2), likely due to the additional phosphorous functionalized acrylate (in binder compositions 3 and 4) and sulfenamide (in composition 4). Furthermore, the fire retardant compositions comprising poly(styrene-co-acrylate) (entries 11 and 12) showed an enhanced flame retardant efficacy compared to entry 2. In addition, the fire retardant compositions of entries 3-8 comprising different additives show enhanced flame retardant efficacy compared to compositions without an additive (entries 1 and 2). Furthermore, a composition comprising binder Acronal Eco 6270 and potassium citrate (entry 2) shows enhanced flame retardant efficacy compared to a composition without potassium citrate (entry 1). Also compositions comprising binder Acronal Eco 6270 and poly(methacrylate sodium salt) (entry 13) or ethylenediaminetetraacetic acid, tripotassium salt dehydrate (entry 14), show enhanced flame retardant efficacy compared to compositions without a salt of an organic acid (entry 1).

In addition, the single burning item test (EN13823:2010+ A1:2014) was performed on two wood samples of spruce, as shown in Table 5. The total amount of fire-retardant composition used was 350 g/m$^2$ corresponding to approximately 79 g/m$^2$ of potassium citrate salt.

TABLE 5

| | Single burning item test | | |
| --- | --- | --- | --- |
| Sample | Composition | TSP | THR (600) |
| 1 | Potassium citrate + 10% binder composition 2 $^{a)}$ | 94.7 m$^2$ | 9.7 MJ |
| 2 | Potassium citrate + 10% binder composition 2 $^{a)}$ + 2 wt % sulfenamide (N-(cyclohexylthio)-phthalimide | 40.4 m$^2$ | 5.7 MJ |

$^{a)}$ Binder composition 2 using 6 g of silicon functionalized acrylate and providing a water contact angle of 70 degrees for the produced coating was used.

Example 7: Testing of Fire Performance of a Fire Retardant Composition Comprising Pigment A fire-retardant chemical composition according to Example 4a was prepared with the difference that the amounts of potassium carbonate and citric acid monohydrate were 100 kg (724 mol) and 101.4 kg (482 mol), respectively. The prepared composition was subjected to tests for its flame retardant properties in accordance with EN 13501-1: 2007 and A1:2009. The product tested was 20 mm or 45 mm thick spruce wood treated with the composition of Example 4a. The wood was treated using the impregnation method, the total amount of fire-retardant used was 350 g/m$^2$ corresponding to approximately 72 g/m$^2$ of potassium citrate salt. No additional coating was added to the treated wood. The classification includes two separate tests: a single burning item test and an ignitability test.

The single burning item test (EN13823:2010+A1:2014) in which a single burning item (a 30-kW propane burner in the test setup) is placed in a corner between two walls treated with the fire-retardant composition and exposed to the flame for 20 minutes and the exhaust gases collected in an exhaust duct. During the test, the heat release rate (HRR) of the sample is measured by oxygen calorimetry, the smoke production rate (SPR) is measured based on the attenuation of light in the exhaust duct, falling of flaming droplets or particles is visually observed for the first 600 seconds, and additionally lateral flame spread is observed. The classification parameters of the test are fire growth rate index (FIGRA), lateral flame spread (LFS), total heat release (THR$_{600s}$), and the additional classifications for smoke production that are smoke growth rate index (SMOGRA) and total smoke production (TSP$_{600s}$). The occurrence of flaming particles or droplets during the first 600 s of the test is also classified.

The second test included is the ignitability test (EN ISO 11925-2) in which the sample is directly subjected to a small flame. The flame is applied to a vertical sample at a 40° angle and a piece of filter paper is placed below the sample to monitor the falling of flaming debris. The flame is applied for 30 s and the entire duration of the test is 60 s. The results of the tests are summarized in Table 6 below.

TABLE 6

Test results of fire performance of a fire retardant composition comprising pigment, prepared as described in Example 7 (comprising organic salt, binder, surfactant, and pigment).

| Test method | Parameter | # of tests | Results |
| --- | --- | --- | --- |
| EN13823:2010 | FIGRA$_{0.2\ MJ}$ (W/s) | 2 | 119.5 |
| | THR$_{600\ s}$ (MJ) | | 6.3 |
| | LFS | | <1000 mm |
| | SMOGRA (m$^2$/s$^2$) h | | Threshold not reached |
| | TSP$_{600\ s}$ (m$^2$) | | 36.6 |
| | Flaming droplets <10 s | | No |
| | Flaming droplets >10 s | | No |

Based on the tests, the sample is classified as B-s1-d0.

Example 8: Testing of Fire Performance of a Fire Retardant Composition Comprising Radical Generator A fire-retardant composition was prepared according to the method of Example 4b. The composition was evaluated for efficiency as a fire-retardant as in example 7. The product tested was 20 mm or 25 mm thick cedar wood treated with the composition. The wood was treated using the impregnation method, the total amount of fire-retardant used was 350 g/m$^2$. The results of the tests are summarized in Table 7 below.

TABLE 7

Test results fire performance of a fire retardant composition comprising radical generator prepared as described in Example 4b (comprising organic salt, binder, surfactant, pigment and radical initiator).

| Test method | Parameter | # of tests | Results |
| --- | --- | --- | --- |
| EN13823:2010 | FIGRA$_{0.2\ MJ}$ (W/s) | 6 | 65.4 |
| | FIGRA$_{0.4\ MJ}$ (W/s) | | 58.8 |
| | THR$_{600\ s}$ (MJ) | | 4.2 |
| | LFS | | <1000 mm |
| | SMOGRA (m$^2$/s$^2$) | | Threshold not reached |
| | TSP$_{600\ s}$ (m$^2$) | | 28.5 |
| | Flaming droplets <10 s | | No |
| | Flaming droplets >10 s | | No |

Based on the tests, the sample is classified as B-s1-d0.

Example 9: VOC Emission Testing, CDPH

The chemical composition of Example 4a was tested for compliance with the standards set for the emission of volatile organic compounds (VOC's) and other harmful compounds into the air. The tests were performed according to the standards CEN/TS 16516, ISO 16000 parts-3, -6, -9, and -11, as well as CDPH (California Department of Public Health) and results of the tests are summarized in Table 8 below. Specific information on sampling and analyzes can be found from the respective standardizing agencies.

The sample composition was homogenized and applied onto petri discs with planar bottoms. On each sample, three layers of an application amount of 120 g/m$^2$ were applied with a drying time of 1 h.

The dry samples were placed in an enclosed test chamber where the air change rate, temperature and relative humidity (RH) were maintained and the levels of total VOC's (TVOC; C5-C17), formaldehyde and acetaldehyde were monitored after 11, 12, and 14 days to determine the area specific emission rate (SER) from which the concentration of said VOC in the air of a standardized classroom or office room can be calculated according to CDPH. The results of the tests are summarized in Table 8 below.

TABLE 8

Test results of VOC emission testing (CPDH) of flame retardant chemical composition prepared according to Example 4a; obtained levels of TVOCs, formaldehyde and acetaldehyde.

| | | Test after 14 days | | |
| Parameter | CAS No. Single compounds | Conc. in classroom [$\mu g/m^3$] | Conc. in office room [$\mu g/m^3$] | ½ CREL [$\mu g/m^3$] |
|---|---|---|---|---|
| TVOC (C5-C17) Single compounds (with defined CREL values) | — | <2 | <2 | — |
| Formaldehyde | 50-00-0 | <2 | <3 | ≤9 |
| Acetaldehyde | 75-07-0 | <2 | <3 | ≤70 |

In Table 8, CREL=relative concentration, TVOC=total volatile organic compounds.

Example 10: VOC Emission Testing, M1

The composition of Example 4a was tested for VOC emissions according to the M1 protocol of January 2015. The tests are standardized according to CEN/TS 16516, ISO 16000 parts-3, -6, -9, and -11, M1, and EN15251 appendix C. The testing sample preparation and testing procedure were identical to those described in Example 9 with the exception that the time period for testing was 28 days. Additionally, a sensory test of the odor of the samples was carried out. The results from the VOC emission tests after 28 days are presented in Table 9.

TABLE 9

VOC emission test (M1) results after 28 days of a flame retardant chemical composition prepared according to Example 4a.

| | CAS No. | Concentration [$\mu g/m^3$] | SER [$\mu g/(m^3 \, h)$] |
|---|---|---|---|
| TVOC | | <5 | <2 |
| TVVOC | | <5 | <2 |
| TSVOC | | <5 | <2 |
| Carcinogens | | <1 | <1 |
| Formaldehyde | 50-00-0 | <3 | <2 |
| Ammonia | 7664-41-7 | 17 | 5.9 |

In Table 10, TVOC=total volatile organic compounds, TVVOC=total very volatile organic compounds, TSVOC=total semi-volatile organic compounds, SER=specific emission rate.

The sensory testing was done after 28 days' storage under controlled conditions in the testing chamber. The test panel assessed the odor first of the room air and then give the odor rating twice for each chamber. Between two assessments there was a minimum break of 2 minutes. Each single judgement was based on the odor impression after 2-3 inhalations. The odor was rated immediately after each assessment on a continuous scale with values between +1

(clearly acceptable) and −1 (clearly unacceptable), with just acceptable=+0.1 and just unacceptable=−0.1. The scale was read with an accuracy of ±0.1. The result was calculated as the average of the assessments from the odor rating of the panel, and only results with a note >0.1 are accepted. Only panel members rating clean moistened air as acceptable (>0.8) were considered in the calculation.

The sample received an average assessment of 0.9 with a 90% confidence interval of 0.9-0.9 and standard deviation of 0.1.

The results for the tested sample are compared to the M1 limit values in Table 10.

TABLE 10

Comparison with M1 limit values of a flame retardant chemical composition prepared according to Example 4a.

| Parameter | Area specific emission rate mg/($m^2$ h) | Limit value mg/($m^2$ h) |
|---|---|---|
| TVOC | <0.002 | ≤0.2 |
| Formaldehyde | <0.002 | ≤0.05 |
| Ammonia | 0.0059 | ≤0.03 |
| Total carcinogens | <0.001 | ≤0.005 |
| Odor (dimensionless) | 0.9 | ≥0.0 |

Based on the tests, the composition of Example 4a conforms to the M1 standard.

Example 11: Weathering-Resistance of Fire Retardant Treatment

The durability of fire retardant treatments to weathering are evaluated according to European norm EN 16755 by testing the effectiveness of the treatment using a cone calorimeter according to ISO 5660 before and after weathering according to the NT FIRE 053-method for artificial weathering.

The weathering resistance was evaluated by treating a total of six 20 mm×100 mm×100 mm pieces of spruce with an amount of fire retardant composition prepared according to Example 4a in an amount that corresponds to approximately 350 g/$m^2$, three pieces were subjected to artificial weathering and the remaining three used as unweathered controls.

Based on evaluation using a cone calorimeter, the total heat release (THR) of the weathered samples was increased, on average, by 15.6% compared to the unweathered controls. This conforms to EN 16755 whereby THR may not increase by more than 20% during weathering.

Based on the measurements, the samples fulfill the heat release rate (HRR 30 s ave.) requirements of <150 kW/m² for fire classification class B.

The invention claimed is:

1. A composition for imparting flame retardancy, wherein the composition comprises:

an organic salt as a fire-retardant compound, a surfactant, and a binder, wherein the composition is free of ammonium phosphate and boron compounds, wherein the organic salt can be admixed with the binder without flocculation, creaming or sedimentation, wherein the organic salt is selected from the group consisting of potassium, magnesium, or bismuth salts of an organic acid, and any combination thereof, wherein the organic acid is selected from the group consisting of citric acid (CAS number 77-92-9) and its hydrates, and any combination thereof, wherein the binder comprises at least one member selected from the group consisting of:

a polymer of one or more acrylate monomers independently selected from the group consisting of n-butyl acrylate (BA), methyl methacrylate (MMA), lauryl acrylate, and phenoxy ethyl acrylate;

a copolymer of two or more monomers, each independently selected from the group consisting of acrylates and styrene;

copolymers formed from monomer mixtures comprising BA and MMA together with functional monomers comprising silicon, phosphorus, fluorine, nitrogen derivatives and/or radical generators, or combinations thereof; and a polymer of an acrylate or styrene, wherein the acrylate is selected from the group consisting of n-butyl acrylate (BA), ethyl acrylate, methacrylates, lauryl acrylate, phenoxy ethyl acrylate, tripropylene glycol diacrylate, hexanediol diacrylate, and trimethylolpropane triacrylate, wherein the composition comprises 10-70% of the organic salt by weight of the composition, and wherein the composition is in the form of an aqueous solution.

2. The composition of claim 1, wherein the composition further comprises a compound with anti-bacterial and/or anti-fungal activity.

3. The composition of claim 1, wherein the composition further comprises a radical generator that further improves fire-retardant properties of the composition.

4. The composition of claim 1, wherein the binder comprises a polymer of one or more acrylate monomer(s) independently selected from the group consisting of n-butyl acrylate, methyl methacrylate, lauryl acrylate, and phenoxy ethyl acrylate.

5. The composition of claim 2, wherein the binder comprises a copolymer of two or more monomers each independently selected from the group consisting of n-butyl acrylate, methyl methacrylate, and styrene.

6. The composition of claim 1, wherein the binder provides a water contact angle equal to or higher than 51° for a coating.

7. The composition of claim 1, wherein the composition further comprises a moisture-binding compound.

8. The composition of claim 3, wherein the radical generator is selected from the group consisting of sulfenamides, 2,3-dimethyl-2,3-diphenylbutane, 1,4-diisopropylbenzene, alkoxyamines, peroxides, disulfides, azo alkanes, oxyimides, silyl amines, phosphorous-based flame retardants, their derivatives, and mixtures thereof.

9. The composition of claim 8, wherein the sulfenamide or the alkoxyamine is selected from the group consisting of bis(1-undecanoxy-2,2,6,6-tetramethylpiperidin-4-yl)carbonate, 1-cyclohexyloxy-2,2,6,6-tetramethyl-4-octadecylaminopiperidine, bis(1-octyloxy-2,2,6,6-tetramethylpiperidin-4-yl) sebacate, 2,4-bis[(1-cyclohexyloxy-2,2,6,6-tetramethylpiperidin-4-yl)butylamino]-6-(2-hydroxy-ethylamino-s-triazine, bis(1-cyclohexyloxy-2,2,6,6-tetramethylpiperidin-4-yl) adipate, 2,4-bis[(1-cyclohexyloxy-2,2,6,6-tetramethylpiperidin-4-yl) butylamino]-6-chloro-s-triazine, 1-(2-hydroxy-2-methylpropoxy)-4-hydroxy-2,2,6,6-tetramethylpiperidine, 1-(2-hydroxy-2-methylpropoxy)-4-oxo-2,2,6,6-tetramethylpiperidine, 1-(2-hydroxy-2-methyl-propoxy)-4-octadecanoyloxy-2,2,6,6-tetramethylpiperidine, bis(1-(2-hydroxy-2-methylpropoxy)-2,2,6,6-tetramethylpiperidin-4-yl) sebacate, bis(1-(2-hydroxy-2-methylpropoxy)-2,2,6,6-tetramethylpiperidin-4-yl) adipate, 2,4-bis {N-[1-(2-hydroxy-2-methylpropoxy)-2,2,6,6-tetramethylpiperidin-4-yl]-N-butyl-amino}-6-(2-hydroxyethylamino)-s-triazine, the reaction product of 2,4-bis[(1-cyclohexyloxy-2,2,6,6-tetramethylpiperidin-4-yl)-butylamino]-6-chloro-s-triazine with N,N'-bis(3-aminopropyl)ethylenediamine); 2,4-bis[(1-cyclohexyloxy-2,2,6,6-tetramethylpiperidin-4-yl)buty-lamino]-6-(2-hydroxy-ethylamino-s-triazine, 2,2,6,6-tetramethyl-1-(phenylthio) piperidin-4-one, 1-((4-methoxyphenyl)thio)-2,2,6,6-tetramethylpiperidin-4-one, 2,2,6,6-tetramethyl-1-((4-nitrophenyl)thio)-piperidin-4-one, 1-(2-nitrophenylthio)-2,2,6,6-tetramethylpiperidin-4-one, 2,2,6,6-tetramethyl-1-(4-methylphenylthio) piperidin-4-one, 1-(2,4,6-trimethylphenylthio)-2,2,6,6-tetramethylpiperidin-4-one, 1-(2-pyridylthio)-2,2,6,6-tetramethylpiperidin-4-one, 1,2-bis(2,2,6,6-tetramethyl-1-(phenylthio) piperidin-4-ylidene) hydrazine, 2,2,6,6-tetramethyl-1-(phenylthio)-4-piperidyl methacrylate, 2,2,6,6-tetramethyl-1-(((thioxo-24-sulfaneylidene)amino)thio) piperidin-4-one, trans-2,5-dimethyl-1,4-bis(phenylthio) piperazine, 1-butylsulfanyl-2,2,6,6-tetramethylpiperidine, 4'-thiobis-morpholine, 1,1'-thiobis-(2,6-dimethyl) piperidine, 1,1'-thiobis-(2,2,6,6-tetramethyl) piperidine, N-1,5,9-((4-methoxyphenyl)thio))-bis-(2,2,6,6-tetramethyl-4-piperidyl)-amine, 1,1'-thiobis phthalimide, 1,1'-thiobis-carbazole, 2-[(4-methoxyphenyl)thio]-1H-isoindole-1,3(2H)-dione, 9-(phenylthio)-9H-carbazole, 9-[(4-methoxyphenyl)thio]-9H-carbazole, N-2-naphthalenyl-N-phenyl-4-methylbenzenesulfenamide, N-bis[4-(1-methyl-1-phenylethyl)phenyl]-4-methylbenzenesulfenamide, N-cyclohexyl-S-phenyl-N-(phenylthio)thiohydroxylamine, 2,4,6-tris(4-morpholinylthio)-[1,3,5]zine, S-(benzo[d]thiazol-2-yl)-N, N-diisopropylthiohydroxylamine, S-(benzo[d]thiazol-2-yl)-N,N-dicyclohexylthiohydroxylamine, S-(benzo[d]thiazol-2-yl)-N-(benzo[d]thiazol-2-ylthio)-N-(tert-butyl)-thiohydroxylamine, ben-zo[c][1,2,5]thiadiazole, 3-(piperazin-1-yl)¬benzo[d]isothiazole, 5-nitrobenzo[c]isothiazol-3-amine, 3-phenyl-1,2,4-thiadiazol-5-amine, bis(2,2,6,6-tetramethyl-1-(phenylthio) piperidin-4-yl) decanedioate, bis(2,2,6,6-tetramethyl-1-(phenylthio) piperidin-4-yl)carbonate and 1,3-bis(phenylthio)-1H-benzo[d]imidazol-2(3H)-one, or any mixture thereof.

10. The composition of claim 2, wherein the compound with antifungal and/or antibacterial activity is selected from the group consisting of nitrates, silver nitrate, nitrites, sodium nitrite, benzoates, sodium benzoate, sulfites, sulfur dioxide, and any combination thereof.

11. The composition of claim 1, wherein said composition additionally comprises a pigment.

12. The composition of claim 1, wherein the binder additionally comprises a phosphorous compound.

13. A method of imparting flame retardancy to a material comprising applying a composition of claim 1 to the material.

14. The composition of claim 1, wherein the surfactant is selected from the group consisting of dialkyl sulfosuccinates, polyether-modified polysiloxanes, and fatty alcohol ethoxylates or mixtures thereof.

15. The composition of claim 1, wherein the composition comprises 10-40% of the organic salt by weight of the composition.

16. The composition of claim 1, wherein the composition comprises 10-23% of the organic salt by weight of the composition.

17. The composition according to claim 1, wherein all components of the composition are present in a mixture.

* * * * *